US 6,620,307 B2

(12) United States Patent
Zaitsev et al.

(10) Patent No.: US 6,620,307 B2
(45) Date of Patent: Sep. 16, 2003

(54) METHOD FOR A REMOVAL OF CATHODE DEPOSITIONS BY MEANS OF BIPOLAR PULSES

(75) Inventors: Alexandr Zaitsev, Ufa (RU); Nasich Zijatdinovich Gimaev, Ufa (RU); Voctor Kutsenko, Ufa (RU); Nailya A. Amirchanova, Ufa (RU); Aleksandr Leonidovich Belogorsky, Ufa (RU); Natalya Markelova, Ufa (RU); Rafail Ramzisovich Muchutdinov, Ufa (RU); Maarten Brussee, Drachten (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/139,181

(22) Filed: May 6, 2002

(65) Prior Publication Data
US 2003/0010650 A1 Jan. 16, 2003

(30) Foreign Application Priority Data
May 8, 2001 (EP) .............................. 01201665

(51) Int. Cl.[7] ................................ B23H 3/00
(52) U.S. Cl. ................ 205/641; 205/645; 205/652; 204/228.7

(58) Field of Search .................. 205/641, 642, 205/643, 644, 645, 652, 103; 204/228.1, 228.9, 229.6, 229.8, 229.9, 230.1, 228.7

(56) References Cited

U.S. PATENT DOCUMENTS 4,035,251 A * 7/1977 Shiver et al. ............... 205/336
5,833,835 A * 11/1998 Gimaev et al. ............. 205/645

FOREIGN PATENT DOCUMENTS

EP 0454081 A2 4/1991
EP 0461756 A1 5/1991

* cited by examiner

Primary Examiner—Roy King
Assistant Examiner—Wesley A. Nicolas

(57) ABSTRACT

A method for on-line removal of cathode depositions during electrochemical process. The process control unit (30) is arranged to alternate the unipolar machining voltage pulses U1 with the voltage pulses of opposite polarity U2 to the work piece (2) and the cathode (3). The process control unit comprises an arrangement to determine the amount of cathode depositions on-line based on the operational parameter. Only in case the operational parameter exceeds the allowable level, the process control unit (30) alternates the unipolar machining voltage pulses U1 with the voltage pulses of opposite polarity U2. In this case the cathode wear is minimized.

14 Claims, 4 Drawing Sheets

METHOD FOR A REMOVAL OF CATHODE DEPOSITIONS BY MEANS OF BIPOLAR PULSES

BACKGROUND OF THE INVENTION

1. Field of the Invention

The invention relates to a method of electrochemically machining an electrically conductive work piece in an electrolyte by applying bipolar electric pulses between the work piece and an electrically conductive electrode, one or more voltage pulses of unipolar machining polarity being alternated with voltage pulses of opposite polarity, while a gap between the work piece and the electrode is maintained, which gap is filled by the electrolyte.

The invention further relates to an arrangement for electrochemically machining of an electrically conductive work piece in an electrolyte by applying bipolar electric pulses between the work piece and an electrode, one or more voltage pulses of unipolar machining polarity being alternated with voltage pulses of an opposite polarity, while a gap between the work piece and the electrode is maintained, which gap is filled by the electrolyte.

2. Description of the Related Art

Electrochemical machining is a process in which an electrically conducting work piece is dissolved at the location of an electrode while electrolyte and electric current is supplied. For this purpose, the electrode is brought in the proximity of the work piece and, while electrolyte is fed into the gap between the work piece and the electrolyte a powerful current is passed through the work piece and the electrode via the electrolyte, the work piece being positive with respect to the electrode. The current is applied in the form of machining pulses having a given amplitude and duration. In the intervals between the machining pulses the electrolyte is renewed. Under the working conditions the work piece is being dissolved, thus increasing the value of the gap between the work piece and the electrode. To compensate for this, the electrode and the work piece are moved towards one another with a given feed rate, as a result of which the electrode forms a cavity or eventually a hole in the surface of the work piece, the shape of the cavity or hole having the shape corresponding to the shape of the electrode. This process can be used, for example, for making intricate cavities or holes in or for shaping hard metals or alloys. The copying precision with which the shape of the cavity or the hole in the work piece corresponds to the shape of the electrode is important for the quality of the result.

A method to perform electrochemical machining where bipolar voltage pulses are utilized is known from U.S. Pat. No. 5,833,835. A pulse component of opposite polarity to that of the machining pulses is used to remove deposits on the front surface of the electrode. The amplitude of the pulses of the opposite polarity is limited by the condition of a wear of the surface of the electrode. This condition is checked by performing a test based on a value of the polarization voltage between the work piece and the electrode after a termination of machining pulses.

The disadvantage of the known method is the fact that the process of the removal of cathode depositions is not controlled, as there is no information available in the system upon the extent of the cathode depositions. Therefore, it is possible that the surface of the cathode is not completely cleaned, leading to deviations in the effective geometrical shape of the cathode. This results in an inferior accuracy of the electrochemical machining.

SUMMARY OF THE INVENTION

It is an object of the invention to provide a method to improve the accuracy and the efficiency of the electrochemical machining, due to an improved process of determination of cathode depositions followed by a controlled removal of the depositions from the front surface of the electrode.

The method according to the invention is characterized in the steps of:

performing a measurement of a first value of an operational parameter that depends on the cleanness of the front surface of the electrode, the first value corresponding to a clean front surface of the electrode;

performing a measurement of a second value of the operational parameter in an interval between the unipolar machining voltage pulses after at least one unipolar machining voltage pulse is applied;

performing a computing of a deviation between the first value and the second value of the operational parameter; and application of at least one voltage pulse of the opposite polarity only after the computed deviation is non-zero.

According to the technical feature of the invention a measurement of the first value of the operational parameter corresponding to a condition of a clean electrode surface is performed and is further used as a reference value in order to derive the extent of the cathode depositions. It is understood that after application of machining pulses depositions occur on the front surface of the electrode. This phenomenon is pronounced especially under conditions of difficult evacuation of the products of chemical reactions taking place in the gap. The depositions thus formed comprise mainly hydrates and oxides of chemical elements present in the work piece. The mechanism of a deposition formation and its removal under bipolar electrochemical machining is as follows. It is understood that the metals, for example Fe, Ni, Al, Ti, Cr are ionized in water solutions of salts under electrochemical machining of different types of metals. These ionized metals are transported by the electrolyte flow in the vicinity of the cathode, where they form oxides, hydroxides and salts, for example $Fe(OH)_3$, $Cr(OH)_3$, $Ni(OH)_2$, $Al(OH)_3$, $FeOH(NO_3)_2$, $Fe(OH)_2NO_3$. These compositions further lead to a formation of positively charged colloids, like $[mFe(OH)_3nFe^{3+}(n-x)OH^-]^{2+}$. The underlying chemical reactions form a basic knowledge for a person skilled in the art. When these colloids reach the surface of the cathode, they are deposited there in a form of cathode depositions. The main physical processes for the formation of the cathode depositions are electrophoretic transport of positively charged particles and their further adsorption at the cathode surface. In the bipolar mode, the anode processes occur at the cathode surface, when the voltage pulses of the opposite polarity are applied to the gap. This process is characterized by an intense oxygen formation, according to a reaction:

$$2H_2O - 4e \rightarrow O_2 + 4H^+$$

The oxygen formation leads to the removal of the depositions from the cathode surface first by means of mechanical rupture of the layer of the depositions. Secondly, an acid is formed in a vicinity of the cathode, with a pH-value in the order of 1–2. Several chemical reactions occur at the surface of the cathode leading to a further removal of the depositions under the influence of the acid thus formed. Thus, the front surface of the cathode is cleaned, as a result of a mechanical influence of the oxygen formation accompanied by a chemical dissolution of the depositions in the formed acid layer.

The chemical and phase composition of cathode depositions is determined by the material of the work piece (anode) and can differ from the material of the electrode (cathode). Thus, properties of the cathode are varied, if the depositions of a different element composition occur on the surface of the cathode. By selecting an appropriate property of the cathode as the operational parameter, the generation of the depositions can be detected. This provides the possibility to obtain the information about the extent of the formation of the depositions on the front surface of the electrode. Thus, one obtains a quantitative information about the extent of the cathode depositions by performing on-line measurements of the operational parameter and by comparing the measured value with a reference value corresponding to a clean surface of the cathode. This information is used in the method according to the invention in order to perform a removal of the cathode depositions in an accurate and controlled way by means of an application of voltage pulses of the opposite polarity if the deviation between the first value and the second value of the operational parameter has occurred. The amplitude, the pulse upslope and the duration of the pulses of the opposite polarity are selected in such a way that, for a given value of the gap, an intense acid formation in the vicinity of the front surface of the cathode takes place, the thickness of the acid region being sufficient to dissolve the depositions and to maintain the dissolved depositions in the electrolyte. An example of such operational conditions is achieved for the pulse upslope not greater than 2 $\mu$s, resulting current density value in the gap of at least 1000 A/cm2, and pulse duration in a range of 5 to 20 $\mu$s.

An embodiment of the method according to the invention is characterized in that if the computed deviation between the first value and the second value of the operational parameter is greater than an a-priori defined third value, each successive unipolar machining voltage pulse is followed by a voltage pulse of the opposite polarity for a number of repetitions. From the point of view of the efficiency of the electrochemical process, it is preferable to define a threshold upon which the action for the removal of the cathode depositions must be undertaken. This threshold is quantified by the third value of the operational parameter. In case it is detected that this threshold is surpassed, the system switches to a different mode, where the unipolar machining pulses are alternated with the pulses of the opposite polarity for a number of repetitions. This number of repetitions can be pre-set according to an empirically established value dependent upon the third value of the operational parameter. It is also possible that the application of the voltage pulses of the opposite polarity is stopped when it is detected that the value of the operational parameter reached a predetermined cut-off value.

A further embodiment of the method according to the invention is characterized in that if the computed deviation remains greater than the third value after the application of the number of repetitions, the pulse duration of the voltage pulses of the inverse polarity is increased by a predetermined increment. This technical measure is based on the insight that the efficiency of the removal of the cathode depositions is an integral effect, depending on both the operational conditions of the electrochemical process, like the value of the gap and the electrolyte flow on one hand and on the amplitude and the duration of the applied voltage pulse of the opposite polarity on the other hand.

A still further embodiment of the method according to the invention is characterized in that a value of the electrode potential of the front surface of the electrode is selected as the operational parameter. This technical measure is based on the insight that the chemical and phase composition of cathode depositions is determined by the material of the work piece (anode) and can differ from the material of the electrode (cathode). Thus, the electrode potential is varied, if the depositions of a different element composition occur on the surface of the cathode. This provides the possibility to obtain the information about the formation of the depositions on the front surface of the electrode. By measuring the cathode potential prior to the electrochemical machining or within the first number of machining pulses, the value of the cathode potential corresponding to the surface without the depositions is determined. As the depositions are formed on the surface of the cathode due to the processes described above, the absolute value of the cathode potential is changed. By performing periodic measurements of the cathode potential, it is possible to derive the amount of the generated depositions. The measurements are preferably performed in an interval between the machining pulses. It is further possible to set a predetermined allowable deviation between the initial value of the cathode potential and the actual measured value. This determines the allowable toleration of the geometrical shape of the front surface of the cathode. In case the computed deviation is greater than the pre-set allowable deviation, pulses of the opposite polarity are applied. The details will be further explained with reference to the figures.

A still further embodiment of the method according to the invention is characterized in that in a region, corresponding to an interval between the unipolar machining voltage pulses, an area under a curve of the electrode potential is derived, said area being selected as the operational parameter. This choice of the operating parameter is preferable for electromechanical machining conditions with high electrolyte flow or for small electrolyte paths, or for larger values of the gap. In these conditions, the operating conditions are not favorable for the cathode depositions to be generated to a great extent, resulting in a minor variations in the value of the cathode potential. It is more sensitive to detect the formation of the cathode depositions by analyzing the curve of the electrode potential. Further details will be given with reference to the figures.

A still further embodiment of the method according to the invention is characterized in that the absolute value of the first harmonics of the Fourier transformation of the cathode potential pulse is selected as the operational parameter. This technical measure is based on an insight that the absolute value of the first harmonics of the Fourier transformation is a direct measure of a height of the cathode depositions of the surface of the electrode. Further on, it is understood that, for very short intervals between the pulses of the machining polarity, the coefficients of the Fourier transformation are more sensitive to the cathode depositions than the absolute value of the cathode potential. Additionally, it is possible to monitor the actual value of the first harmonics of the Fourier transformation and to use it as a system control parameter for avoiding an electrode wear. This technical measure is base on an insight that the value of the first harmonics has a positive sign in case the cathode depositions are generated. In case the surface of the electrode is being dissolved as a result of an application of the pulses of the inverse polarity, the sign of the first harmonics of the Fourier transformation changes from 'plus' to 'minus'. Therefore, by monitoring the absolute value of the first harmonics and/or its sign, it is possible to perform the cleaning of the electrode surface from the cathode depositions without inducing electrode wear.

A still further embodiment of the method according to the invention is characterized in that for short intervals between the unipolar machining voltage pulses in a region, corresponding to an interval between the unipolar machining voltage pulses, a slope of a curve of the electrode potential is derived, the slope being selected as the operational parameter. It has been found that the value of the cathode potential is not stabilized between the machining pulses for a high-frequency electromechanical machining. Therefore, it is preferable to use a quantitative characteristic of the course of the curve of the electrode potential. This quantitative characteristic is the slope of the curve, given by:

$$k_\phi = \frac{(\phi_2 - \phi_3)}{(\phi_1 - \phi_2)},$$

where $\phi_1$ is the value of the electrode potential at a time moment i after the machining voltage pulse has been switched off.

By choosing the equidistant sample times for measuring of the corresponding values of the electrode potential in order to determine the slope of the curve, the process control can be further simplified.

The method according to the invention improves the copying accuracy of the electrochemical machining due to the fact that the geometric shape of the electrode is preserved essentially unchanged. The process efficiency can thus be increased by about 20% due to a decrease of the resistance of the gap, obtained surface quality of the work piece is improved by one class.

These and other aspects of the invention will be further discussed with reference to the figures.

DETAILED DESCRIPTION OF THE PRESENTLY PREFERRED EMBODIMENT

Figure 1:
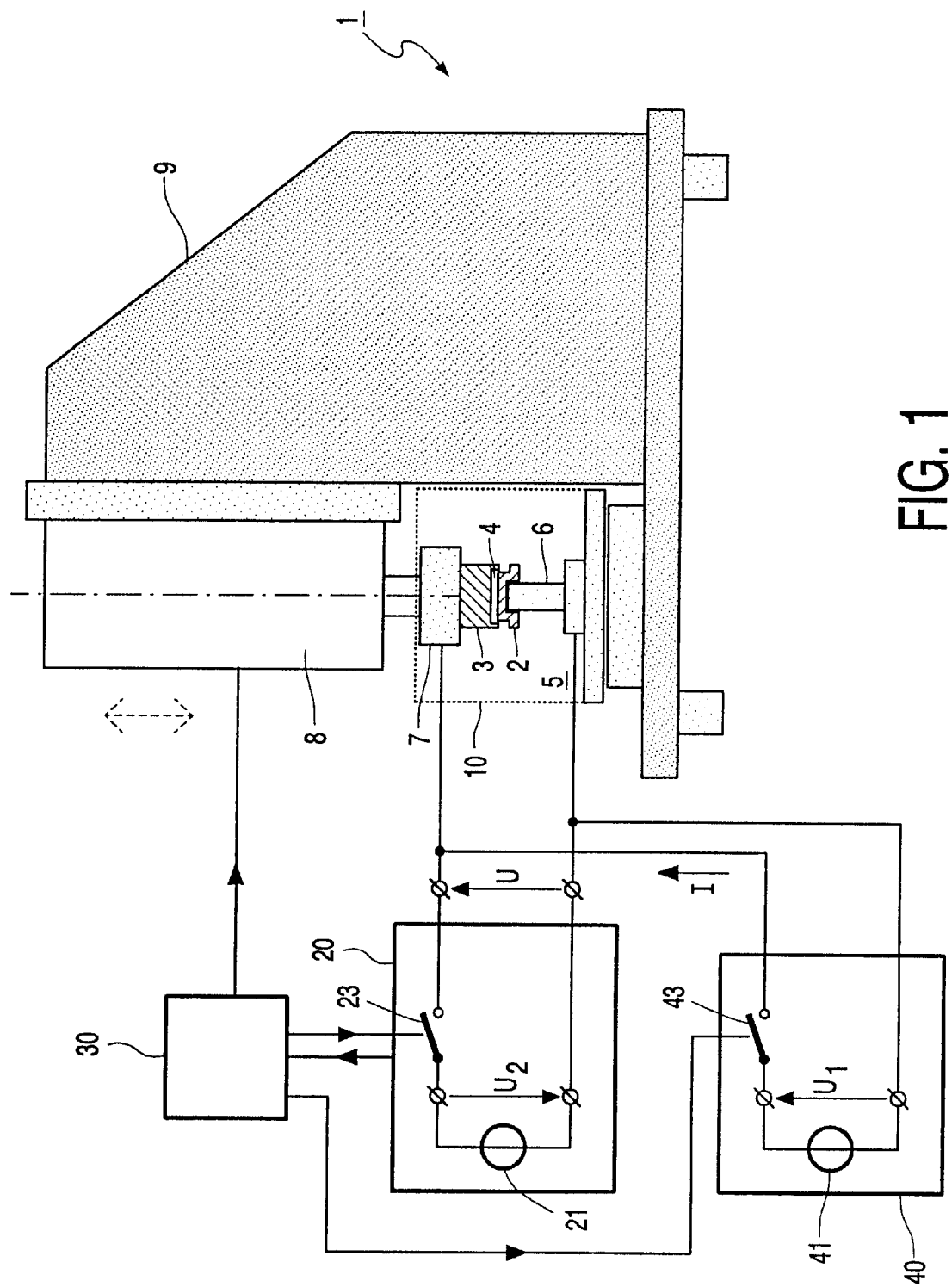
FIG. 1 presents a schematic view of an arrangement for an electromechanical machining in accordance with one embodiment of the present invention.

FIG. 1 presents a schematic view of an arrangement 1 for electrochemically machining of an electrically conductive work piece 2 by means of an electrode 3. The arrangement 1 comprises a base 6 for positioning a work piece 2, a holder 7 for positioning an electrode 3, and an actuator 8 for moving the holder 7 and the base 6 with respect to one another. The base 6 and the actuator 8 are mounted on a chassis 9 having a rigid construction so as to enable a working distance between the electrode 3 and the work piece 2 to be set with a high accuracy. The arrangement comprises further a reservoir 10 filled with an electrolyte 5 in such a manner that the gap 4 formed as a result of the working distance between the electrode 3 and the work piece 2 is filled with the electrolyte 5. In the present case, the electrolyte comprises NaNO$_3$ dissolved in water. As an alternative it is possible to use another electrolyte, such as for example NaCl or a combination of NaNO$_3$ and an acid. The electrolyte 5 is pumped through the gap 4 by means of an installation, not shown in the figure. By means of the arrangement 1, the work piece 2 can be machined be passing a machining voltage pulse from a power supply unit 40 through the electrolyte 5 in the gap 4 via the electrode 3 and the work piece 2. The power supply unit 40 comprises a voltage pulse generator 41 and a controllable switch 43. When the polarity of the applied machining voltage is correct, this results in material of the work piece 2 being removed from its surface and being dissolved in the electrolyte 5 at the location of a small distance between the electrode and the work piece. The shape of thus obtained cavity is determined by the shape of the electrode opposite to it. The arrangement 1 further comprises a second power supply unit 20, where a source of the voltage pulses 21 of the opposite polarity U2 is incorporated. The second power supply source comprises further controllable switch 23 to be operated by the process control unit 30. In case it is detected that the machining pulses U1 are to be alternated with the pulses of the opposite polarity U2, the process control unit 30 alternatively operates the controllable switches 23 and 43 to supply a voltage pulse of suitable polarity to the gap (4). It is also possible to use a power supply, where the first and the second power supply sources are integrated and constitute a single power supply source, which is programmable by the process control unit 30 to deliver alternating voltage pulses of opposite polarity.

The process control unit 30 determines the first value of the operational parameter, for example the value of the electrode potential prior to application of the machining voltage pulses U1 or within the first applied machining voltage pulses. It is preferable to measure the value of the electrode potential in the interval between the machining pulses. It has been found that the major volume of the cathode depositions occur in a period of the first 1 to 5 min of operation with unipolar machining voltage pulses U1. As has been explained earlier, the value of the electrode potential varies, due to occurrence of the cathode depositions. Process control unit 30 performs measurements of the electrode potential under the operating conditions, the value being referred to as the second value of the operational parameter. Based upon the deviation between the first value of the electrode potential and the second value of the electrode potential, a control signal is generated to operate the controllable switches 23 and 43 and to alternatively apply pulses of opposite polarity. As a result, the anode processing will start at the cathode, leading to cleaning of the front surface of the cathode from the generated depositions.

Figure 2:
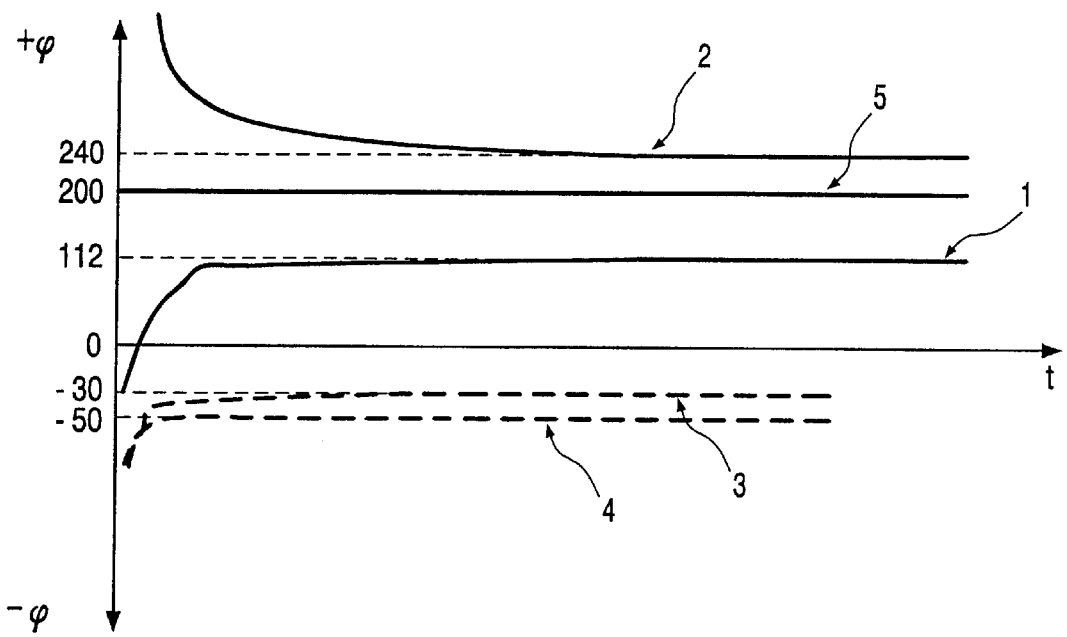
FIG. 2 shows exemplary characteristic curves for the cathode potential for different metals.

FIG. 2 shows characteristic curves for the cathode potential for the materials of clean steel (1); steal with depositions (2); brass with depositions (3); clean brass (4); reference electrode potential of a Ag/Cr electrode (5). As is seen from FIG. 2, the value of the corresponding electrode potentials present reliable means for determining the presence of the cathode depositions. After a machining pulse is terminated, the value of an electrode potential reaches saturation with a corresponding stabilized value, corresponding to an equilibrium in the gap. This stabilized value is used for measurements. However, in operational conditions, like a high-frequency electromechanical machining, the period between the machining pulses is insufficient for the value of the electrode potential to reach the saturated value. Therefore, it is preferable to use a slope of the curve representing the electrode potential as the operational parameter. This is further explained with reference to FIG. 3.

Figure 3:
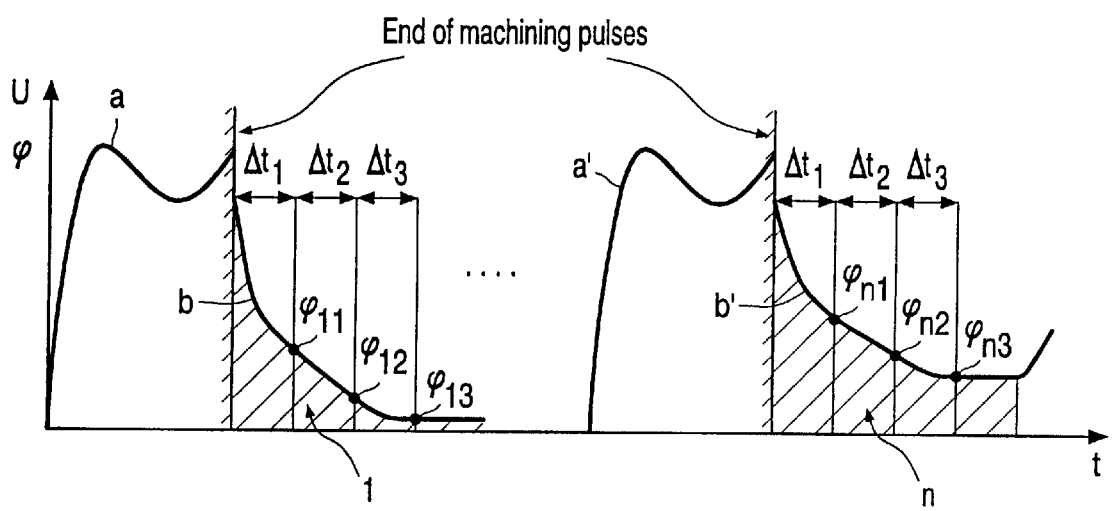
FIG. 3 shows schematically an exemplary value of the electrode potential as a function of time.

FIG. 3 shows schematically a value of the electrode potential as a function of time. Line a represents an example of the development of the machining voltage U corresponding to a machining voltage pulse U1. Line b presents an example of the development of the electrode potential after the machining voltage pulse has been switched off. A hatched line represents a time moment, where the machining voltage is switched off, the electrode potential being further developed following the line b. The slope of the line b is deduced from the measured values of the electrode potential $\phi_1$. As is schematically presented in FIG. 3, the change in the electrode potential, corresponding to a machining pulse 1 is different from that, corresponding to the machining pulse n. The difference between the slopes for the electrode potential present the extent of the generated cathode depositions.

For a condition that a little change occurs in the absolute value of the electrode potential for the time moment nearly immediately after the switching off of the machining voltage, it is preferable to select the area under the curve b as the operational parameter. The determination of the area under the curve can be performed by digitizing the curve itself, or can be measured in an analogue way by integrating the voltage across a capacitance, the charge of the capacitance corresponding to the value of the area under the curve.

Figure 4:
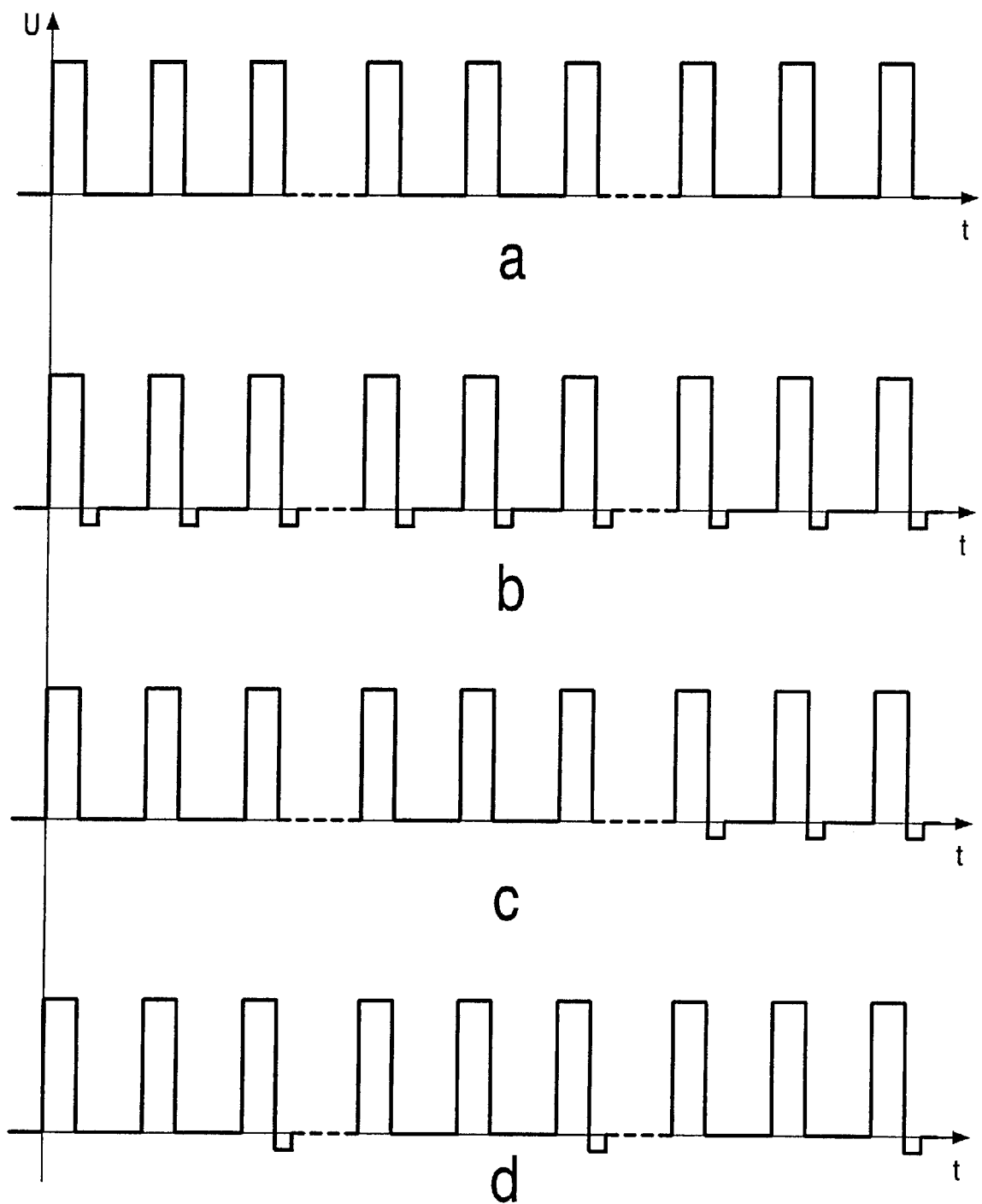
FIG. 4 presents possible modes of application of the voltage of the opposite polarity across the gap.

FIG. 4 presents possible modes of application of the voltage of the opposite polarity across the gap in order to remove the generated cathode depositions. A pulse sequence, given by a, presents a reference machining pulse sequence in a unipolar mode. According to the method of the invention, the measurements of, for example, the electrode potential are performed in an interval between the machining pulses and are compared within the process control unit with a reference value of the electrode potential, corresponding to a clean surface of the cathode. In case it is detected that the cathode depositions occurred, the process control unit operates the controllable switch of the power supply unit for the pulses of opposite polarity. An example of a resulting pulse sequence is given by a curve b, where the pulses of the opposite polarity are applied after each unipolar machining voltage pulse.

An alternative solution is given by the curve c in FIG. 4, where each successive unipolar machining voltage pulse is followed by a voltage pulse of the opposite polarity for a number of repetitions. The number of utilized repetitions can be determined a-priori, based on the empirically established optimal value for given operational conditions. The effect of this technical measure is optimal, if the repetitions are applied only after the deviation between the first value and the second value of the operational parameter exceeded a pre-set third value, the third value being characteristic, for example, to allowable tolerances in the copying accuracy. It is further also possible to interrupt the repetitions, if the value of the operational parameter is being constantly measured and if it is established that the value of the operational parameter has decreased below a pre-set cut-off value. An example of such a mode is given by the pulse sequence d in the FIG. 4.

Figure 5:
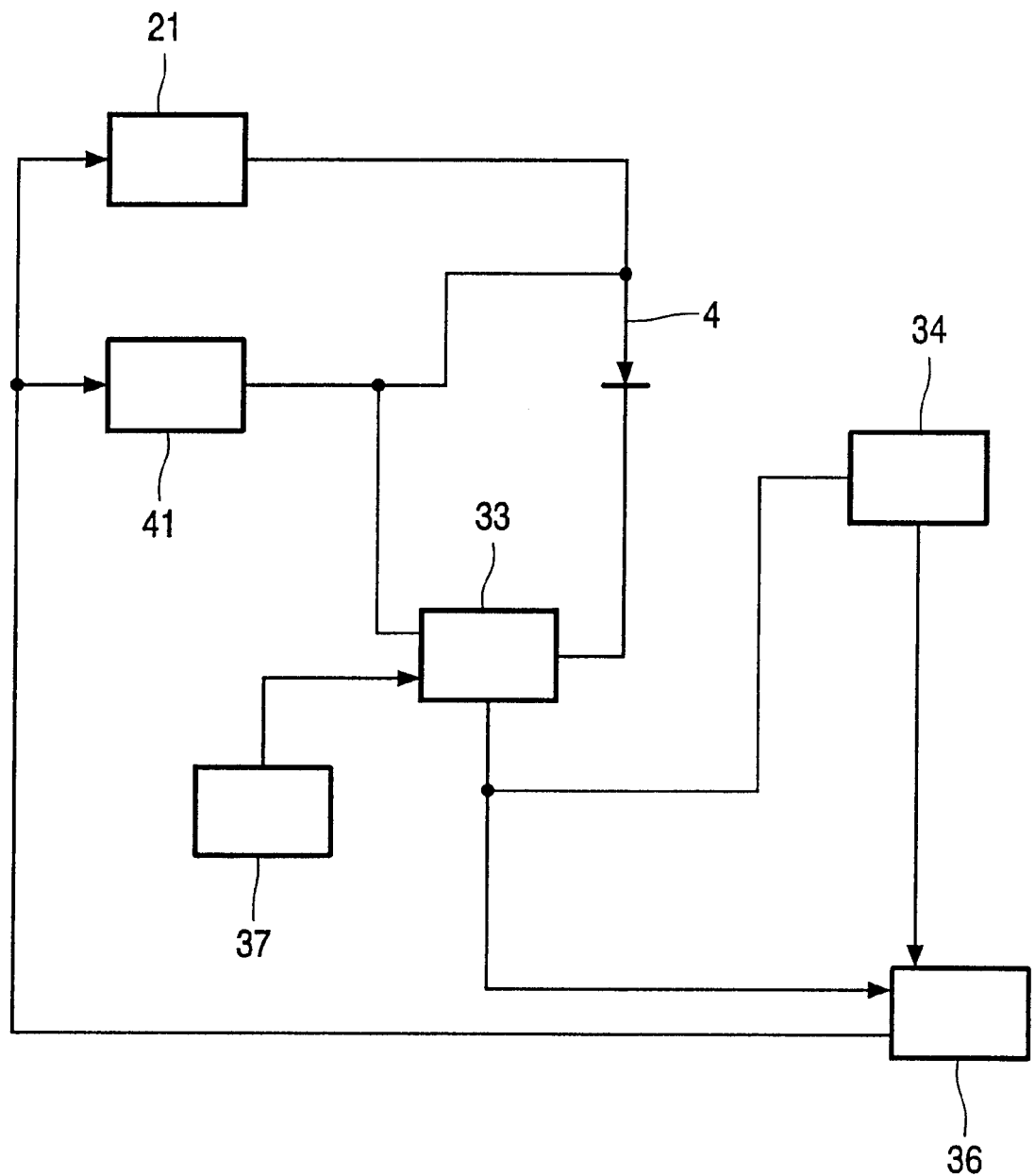
FIG. 5 presents a schematic functional block-scheme of the process control unit in accordance with one embodiment of the present invention.

FIG. 5 presents a schematic functional block-scheme of the process control unit 30. Pulsed power supply generator 41 generate unipolar machining voltage pulses, which are applied to the gap 4. The amplitude and the duration of the unipolar machining pulses is controlled by the pulse control unit 36. Prior to the machining pulses the value of the cathode potential is measured with a probe 33. This value constitutes the first value of the operational parameter and is further stored in a memory unit of the computing unit 34. In the interval between the machining pulses, the probe 33 performs measurements of the electrode potential. Each such measurement constitutes the second value of the operating parameter. The measured values are sent to the computing unit 34, where a deviation between the first value and the second value is performed. In case the computed deviation is non-zero, the computing unit 34 generates a control signal to the pulse control unit 36. Upon receipt of such control signal the pulse control unit alternatively operates the controllable switches of both power supply units 41,21. The resulting pulse sequence corresponds to the curve b in FIG. 4. The process control unit 30 further comprises a sample time generator 37, which controls the probe 33. In some applications, where the cathode deposits are mildly generated it is no necessary to perform a measurement of the operational parameter after each machining pulse.

It is also possible to design a pulse sequence, where the voltage pulses of the opposite polarity are applied selectively, not for each deviation between the first value and the second value of the operating parameter. It is thinkable that for detectable, yet mild cathode depositions, the resulting accuracy of the electrochemical machining stays within allowable tolerances. In this case it is sufficient to perform a cleaning of the cathode surface only, if the extend of the cathode depositions has exceeded a pre-set allowable level. A corresponding third value of the operational parameter can be determined empirically and can be stored in the memory unit of the computing means 34 together with the first value of the operational parameter. If the computing unit 34 detects that the computed deviation between the second value of the operational parameter given by the probe 33, and the first value has exceeded the third value, a control signal is send to the pulse control unit 36. In this case a number of pulse repetitions can be applied to the gap. An example of this operational mode is given by the curve c in FIG. 4. The pre-set number of repetitions is stored in the memory unit of the computing means 34. If after the completion of the pulse repetitions it is observed that the computed deviation still stays above the third value, the computing unit 34 sends a control signal to the pulse control unit 36 in order to increase the pulse duration of the voltage pulses of the opposite polarity by an increment. The value of the increment is determined by the operational conditions and is stored in the memory unit of the computing means 34 in a look-up table. For a machining pulse of 5 ms the corresponding pulse increment for the voltage pulses of the opposite polarity is in the order of 1 ms, the initial duration of the voltage pulses of the opposite polarity being in the order of 2 ms. The given pulse durations are favorable for the following operational conditions: 15% NaNO3, amplitude of the unipolar machining pulses of 8 V, the value of the gap 20 $\mu$m.

Due to the possibility to alternate the machining pulses with pulses of the opposite polarity in a controllable way, it is possible to remove the cathode depositions without introducing the cathode wear. A deviation of the actual value of the operational parameter from the initial value is a measure of the extent of the cathode depositions. By probing the value of the operational parameter on-line it is possible to construct an automated process control, of a kind described above, in order to optimize the accuracy of the electrochemical machining. It has been found that with the method according to the invention the resulting deviation in the copying accuracy was in the order of 20 $\mu$m the corresponding surface roughness constituted 0.2 $\mu$m.

While the embodiments of the invention disclosed herein are presently considered to be preferred, various changes and modifications can be made without departing from the spirit and scope of the invention. The scope of the invention is indicated in the appended claims, and all changes the come within the meaning and range of equivalents are intended to be embraced therein.

What is claimed is:

1. A method of electrochemically machining an electrically conductive work piece by applying bipolar electrical pulses between the work piece and an electrode across a gap being filled by an electrolyte, the bipolar electric pulses including a first set of voltage pulses of unipolar machining polarity and a second set of voltage pulses of an opposite polarity to the first set of voltage pulses, said method comprising:

measuring a first value of an operational parameter, the operational parameter being dependent on a cleanness of a front surface of the electrode;

applying at least one voltage pulse of the first set of voltage pulses between the work piece and the electrode across the gap subsequent to the measuring of the first value of the operation parameter;

measuring a second value of the operational parameter subsequent to the applying of the at least one voltage pulse of the first set of voltage pulses between the work piece and the electrode across the gap;

computing a deviation between the first value of the operational parameter and the second value of the operational parameter subsequent to the measuring of the second value of the operational parameter; and in response to the deviation exceeding a threshold, applying at least one voltage pulse of the second set of voltage pulses between the work piece and the electrode across the gap.

2. The method of claim 1, wherein the threshold is zero.

3. The method of claim 1, wherein the threshold is a non-zero number.

4. The method of claim 1, wherein the operational parameter is an electrode potential of the electrode.

5. The method of claim 1, wherein the operational parameter is an area under a curve of an electrode potential of the electrode occurring between an application of at least two voltage pulses of the first set of voltage pulses between the work piece and the electrode across the gap.

6. The method of claim 1, wherein the operational parameter is a slope of a curve of an electrode potential of the electrode occurring between an application of at least two voltage pulses of the first set of voltage pulses between the work piece and the electrode across the gap.

7. The method of claim 1, wherein the operational parameter is an absolute value of the first harmonics of a Fourier transformation of an electrode potential of the electrode.

8. An apparatus (1) for electrochemically machining an electrically conductive work piece (2) by applying bipolar electrical pulses between the work piece (2) and an electrode (3) across a gap (4) filled by an electrolyte (5), the bipolar electric pulses including a first set of voltage pulses (U1) of unipolar machining polarity and a second set of voltage pulses (U2) of an opposite polarity to the first set of voltage pulses, said apparatus (1) comprising:

a first power supply source (40) operable to supply the first set of voltage pulses (U1) in response to being electrically connected to the work piece (2) and the electrode (3);

a second power supply source (20) operable to supply the second set of voltage pulses (U2) in response to being electrically connected to the work piece (2) and the electrode (3); and a processor control unit (30) in electrical communication with said first power supply source (40) and said second power supply (20), wherein said process control unit (30) is operable to measure a first value of an operational parameter, the operational parameter being dependent on a cleanness of a front surface of the electrode (3), wherein said process control unit (30) is further operable to control an electrical connection of said first power supply (40) to the work piece (2) and the electrode (3) subsequent to the measuring of the first value of the operation parameter to thereby facilitate an application of at least one voltage pulse of the first set of voltage pulses (U1) between the work piece (2) and the electrode (3) across the gap (4), wherein said process control unit (30) is further operable to measure a second value of the operational parameter subsequent to the application of the at least one voltage pulse of the first set of voltage pulses (U1) between the work piece (2) and the electrode (3) across the gap (4), wherein said process control unit (30) is further operable to compute a deviation between the first value of the operational parameter and the second value of the operational parameter subsequent to the measuring of the second value of the operational parameter; and wherein, in response to the deviation exceeding a threshold, said process control unit (30) is further operable to control an electrical connection of said second power supply (20) to the work piece (2) and the electrode (3) to thereby facilitate an application of at least one voltage pulse of the second set of voltage pulses (U2) between the work piece (2) and the electrode (3) across the gap (4).

9. The apparatus of claim 8, wherein the threshold is zero.

10. The apparatus of claim 8, wherein the threshold is a non-zero number.

11. The apparatus of claim 8, wherein the operational parameter is an electrode potential of the electrode (3).

12. The apparatus of claim 8, wherein the operational parameter is an area under a curve of an electrode potential of the electrode (3) occurring between an application of at least two voltage pulses of the first set of voltage pulses (U1) between the work piece (2) and the electrode (3) across the gap (4).

13. The apparatus of claim 8, wherein a slope of a curve of an electrode potential of the electrode (3) between at least two voltage pulses of the first set of voltage pulses (U1) is the operational parameter.

14. The apparatus of claim 8, wherein the operational parameter is an absolute value of the first harmonics of a Fourier transformation of an electrode potential of the electrode (3).

* * * * *